United States Patent Office 3,321,457
Patented May 23, 1967

3,321,457
WATER SOLUBLE DYES OF THE PHENYLAZO-PYRAZOLONE SERIES CONTAINING A 2,3-DI-CHLORO - 6 - QUINOXALINYLCARBONYLA-MINO SUBSTITUENT
Erik Kissa, Wilmington, Del., assignor to E. I. du Pont de Nemours and Company, Wilmington, Del., a corporation of Delaware
No Drawing. Filed Apr. 15, 1964, Ser. No. 360,082
8 Claims. (Cl. 260—154)

This invention relates to compositions of matter useful as reactive dyes for materials possessing in their structure exchangeable hydrogen atoms and more particularly to water-soluble dyes of the phenylazopyrazolone series which possess a 2,3-dichloro-6-quinoxalinylcarbonylamino substituent. Fiber-reactive dyes of this type are described in copending application, Ser. No. 154,028, filed on Nov. 21, 1961. Generally, water-soluble dyes of this nature are produced and sold in the form of their sodiumsulfonate salts.

It has been found that the sodiumsulfonates of the above-described reactive dyes are difficult to apply to cellulosic fabrics in the trade, in some applications, because these dyes appear to exist in two forms, a crystalline rather insoluble form with a solubility less than about 20 g./l. at 25° C. and an amorphorous, relatively unstable, soluble form. It has been observed that the disodiumsulfonate salts, for example, of the phenylazopyrazolone dyes which carry a 2,3-dichloro-6-quinoxalinylcarbonylamino group frequently undergo a transition in form during manufacture and/or during their application in the dyeing process. The soluble form can be obtained consistently by careful manufacture, but it is difficult to maintain adequate control to prevent transition to the insoluble form during application of the dyes under varying mill conditions.

It is an object of this invention to provide the 2,3-dichloro - 6 - quinoxalinylcarbonylamino-phenylazopyrazolone fiber-reactive dyes in a form which does not undergo transition to the crystalline relatively insoluble form. A further object is to provide said dyes in a stable physical state so that the property of good water solubility is maintained throughout the manufacturing and dye application processes. Other objects will appear hereinafter.

It has been found that about one or more chemical equivalents of lithium in the phenylazopyrazolone dye sulfonates which are substituted by a 2,3-dichloro-6-quinoxalinylcarbonylamino group will effect a significant improvement in the water solubility of the dye and, surprisingly, will stabilize the dye in its more water-soluble form which has a solubility of about 150 to 200 g./l. at 25° C. This prevention of a polymorphic transition from the soluble to the insoluble form by changing the type of dye salt was entirely unexpected and is presently without theoretical explanation. The less water-soluble or sodiumsulfonate form of the dyes of this invention afford X-ray diffraction patterns which are characteristic of the crystalline structure. On the other hand, the X-ray patterns of the novel lithiumsulfonates of this invention are characteristic of amorphous substances.

Specifically, the present invention is directed to a fiber-reactive dye of the formula

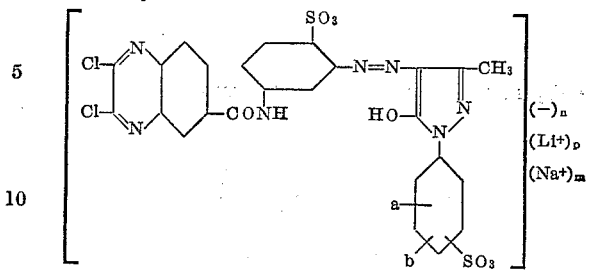

wherein $a$ is selected from the group consisting of H, $CH_3$, Cl and $SO_3$; $b$ is selected from the group consisting of H and Cl; $n$ is an integer equal to the total number of sulfo groups; $p$ is an integer of from 1 to 3 with the proviso that $p$ never exceeds the total number of sulfo groups; and $m$ is an integer of from zero (0) to 3 inclusive, as determined by the result of $n-p$.

Preferred dyes of this invention include a fiber-reactive dye of the formula

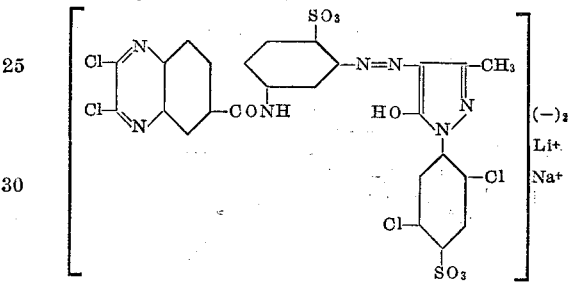

The 2-chloro-5-sulfo analog of the above dye.
The 6-chloro-2-methyl-4-sulfo analog of the above dye.
A fiber-reactive dye of the formula

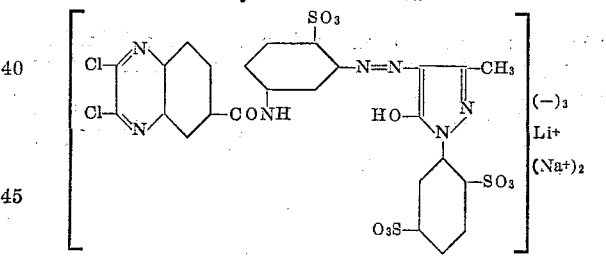

A dye composition comprising the sodium salt of a dye having the formula

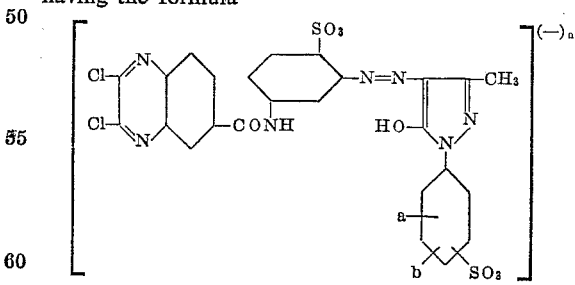

wherein $a$, $b$ and $n$ have the same meaning as above; and at least 0.3 mole of lithium sulfate per mole of the dye.

The present invention is also directed to a process for manufacture of fiber-reactive dyes of the formula

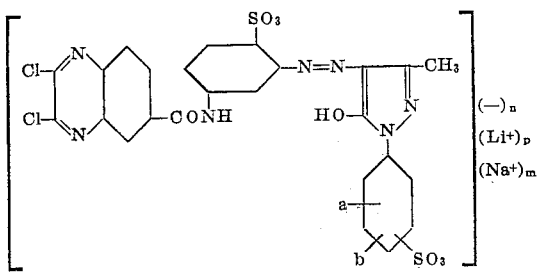

whereby an amino dye base of the formula

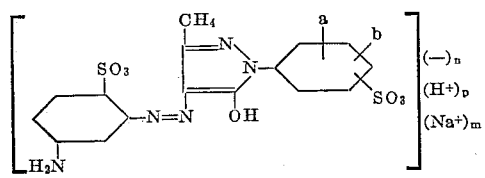

is condensed in aqueous medium with 1 molar equivalent of 2,3-dichloro-6-quinoxalinecarbonyl chloride while the pH is maintained at about 7.5 to 8 by addition of a lithium base selected from the group consisting of lithium hydroxide and lithium carbonate, where $a$, $b$, $n$, $p$ and $m$ are defined as above.

An alternative process for the manufacture of the above dyes comprises treating an aqueous solution of a fiber-reactive dye of the formula

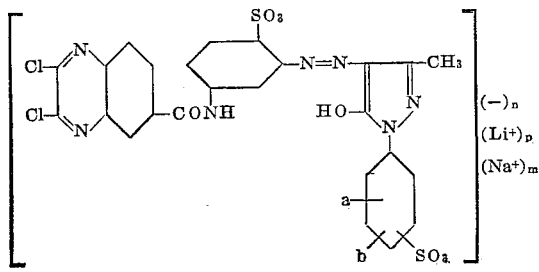

wherein $p$ is zero (0) and $a$, $b$, $n$ and $m$ are defined as above; with at least one chemical equivalent of a water soluble lithium salt.

The following specific examples are illustrative of the present invention and are not given by way of limitation. All parts are by weight.

*Example 1*

(A) 400 parts of the monosodium salt of the monoazo compound obtained by hydrolyzing the acetyl group from the azo compound: 4-acetamido-2-aminobenzenesulfonic acid→3-methyl - 1 - (2,5-dichloro-4-sulfophenyl)-5-pyrazolone are agitated in 3500 parts of water at 25° C. and the pH is adjusted to 7.5–8 by the addition of lithium hydroxide. To the solution thus obtained are added 220 parts of 2,3-dichloro-6-quinoxalinecarbonyl chloride dissolved in 740 parts of xylene. The pH of the stirred reaction mass is maintained at 7.5–8 by gradual addition of a 4.3 N solution of lithium hydroxide. The uptake of alkali ceases after moderate stirring for 8 to 10 hours. After the reaction mass stands for 4 hours the aqueous layer is separated and spray dried in the usual manner, employing an exit temperature in the spray drier below 90° C. A reactive dye of the following formula is obtained,

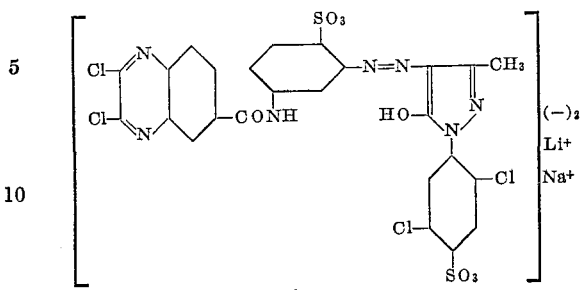

The resulting yellow powder has over 200 g./liter solubility in water at 25° C., and dyes cotton by the usual fiber-reactive dye application methods in bright greenish-yellow shades.

When the pH, in this example, is adjusted and maintained at 7.5–8 by the use of lithium carbonate, similar results are obtained.

(B) When 384 parts of the free sulfonic acid form of the monoazo compound used as starting material in part (A) of this example are condensed with 2,3-dichloro-6-quinoxalinecarbonyl chloride, following the process of said part (A), one obtains the dilithium salt of the dye.

Similarly, a trilithium salt is obtained when one employes as starting material a chemically equivalent amount of the free acid form of the monoazo compound obtained by hydrolyzing the acetyl group from the azo compound: 4-acetamido - 2 - aminobenzenesulfonic acid→3-methyl-1-(2,5-disulfophenyl)-5-pyrazolone.

*Example 2*

375 parts of the disodium salt of the amino-monoazo compound obtained by hydrolyzing the acetyl group from the azo compound 4-acetamido-2-aminobenzenesulfonic acid→3-methyl-1-(2 - chloro-5-sulfophenyl)-5-pyrazolone are condensed with 192 parts of 2,3-dichloro-6-quinoxalinecarbonyl chloride by the method described in Example 1 except that the pH is adjusted and maintained at 7.5–8 by the use of sodium hydroxide. 75 parts of the reactive dye thus obtained are intimately blended with 12.8 parts of lithium sulfate monohydrate. 100 parts of the resulting powder dissolve in 1000 parts of water upon stirring at 75° C., and the dye remains in solution upon cooling to 25° C. The dye in solution, or the dye obtained upon drying this solution, is represented by the formula,

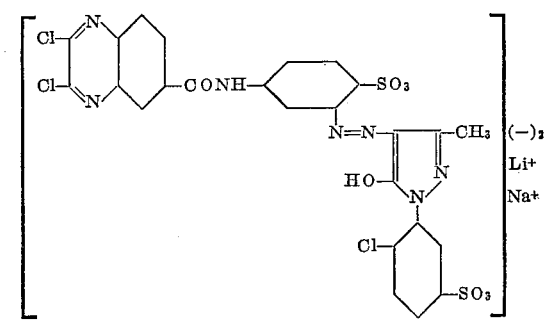

It dyes cellulosic fibers by the usual fiber-reactive dye application methods to give bright greenish-yellow shades.

The disodium salt of the dye of this example (prior to blending with the lithium sulfate) dissolves in boiling water only to the extent of less than 30 g./liter.

When less than 12.8 parts of lithium sulfate monohydrate are used in the blended dye powder of this example, say 3 to 4 parts, the solubility of the dye is also enhanced. The use of more than 12.8 parts of lithium sulfate monohydrate (1 mole ratio) are not required to effect adequate solubility of the dye, but more may be employed if desired.

If 11.0 parts of lithium sulfate are employed in the present example instead of 12.8 parts of lithium sulfate monohydrate, similar results are obtained.

Dyes having other pyrazolone couplers may be employed in the present example, as well as in Examples 1 and 3. Operable couplers include, 3-methyl-1-(2,5-dichloro-4-sulfophenyl)-5-pyrazolone.
3-methyl-1-(2-chloro-5-sulfophenyl)-5-pyrazolone.
3-methyl-1-(2-chloro-4-sulfophenyl)-5-pyrazolone.
3-methyl-1-(3-sulfophenyl)-5-pyrazolone.
3-methyl-1-(4-sulfophenyl)-5-pyrazolone.
3-methyl-1-(2,5-disulfophenyl)-5-pyrazolone.
3-methyl-1-(6-chloro-2-methyl-4-sulfophenyl)-5-pyrazolone.

*Example 3*

Operating as in Example 2, one obtains the disodium salt of the reactive dye which is the condensation product of equal molar amounts of 2,3-dichloro-6-quinoxalinecarbonyl chloride and the amino-monoazo compound 4-(5-amino-2-sulfophenylazo)-3-methyl-1-(6-chloro-2-methyl-4-sulfophenyl)-5-pyrazolone. 86 parts of the dye thus obtained are stirred in 1000 parts of water at room temperature. Upon addition of 4.5 parts of lithium chloride a clear solution is obtained which is useful for dyeing cotton by the typical fiber-reactive dyeing methods to give bright, greenish-yellow shades. The dye in solution, or the dye obtained upon drying this solution, is represented by the formula

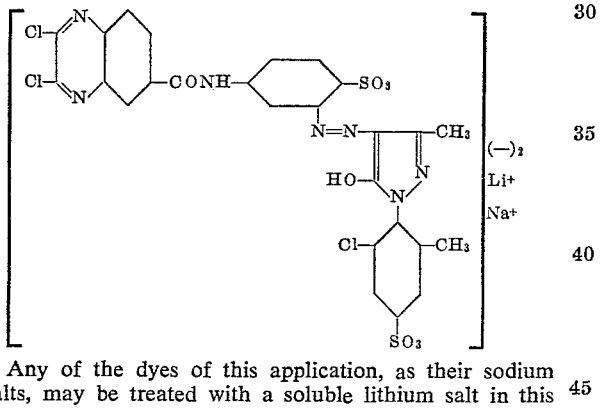

Any of the dyes of this application, as their sodium salts, may be treated with a soluble lithium salt in this manner to afford the mixed Li-Na salts which exhibit excellent water solubilities. Soluble lithium salts include the chloride, sulfate and nitrate. As noted in Example 2, the preferred amounts of the lithium salts range from about 0.3 to 1 mole per mole of dye, although it is often advantageous to use greater quantities of the lithium salt to overcome the presence of additional sodium salts which might be added to the dye solution or dye preparation.

The use of dispersants in the novel dye solutions of this invention, prior to drying, enhance the wettability and pasting of the resulting powder preparations.

As many apparently widely different embodiments of this invention may be made without departing from the spirt and scope thereof, it is to be understood that this invention is not limited to the specific embodiments thereof except as defined in the appended claims.

What is claimed is:

1. A fiber-reactive dye of the formula

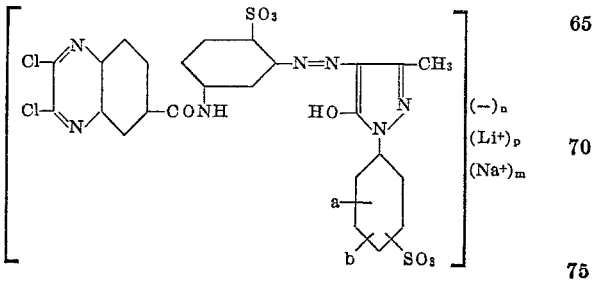

wherein $a$ is selected from the group consisting of H, $CH_3$, Cl and $SO_3$; $b$ is selected from the group consisting of H and Cl; $n$ is an integer equal to the total number of sulfo groups; $p$ is an integer of from 1 to 3 with the proviso that $p$ never exceeds the total number of sulfo groups; and $m$ is an integer of from zero (0) to 3 inclusive, as determined by the result of $n$-$p$.

2. A fiber-reactive dye of the formula

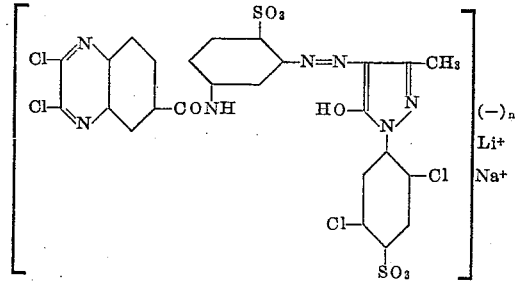

3. A fiber-reactive dye of the formula

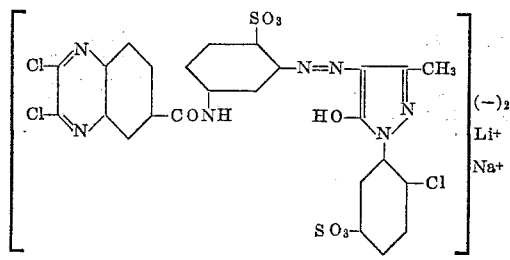

4. A fiber-reactive dye of the formula

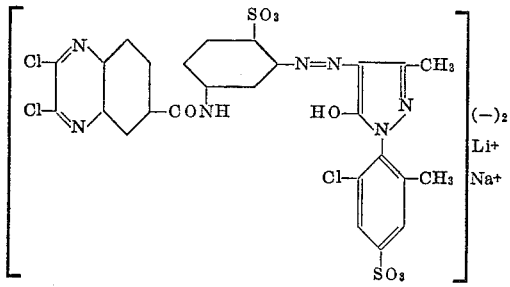

5. A fiber-reactive dye of the formula

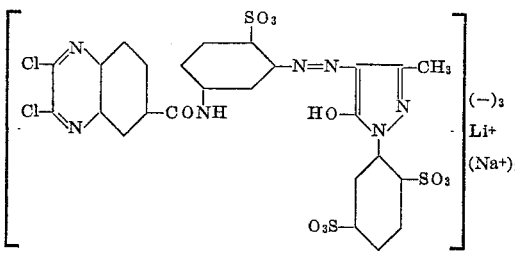

6. A dye composition comprising the sodium salt of a dye having the formula

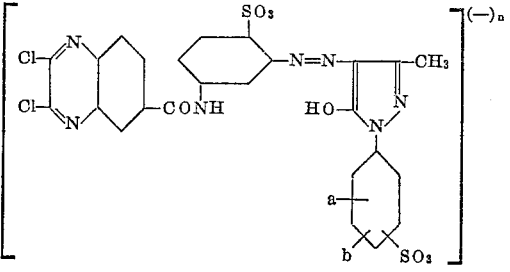

wherein $a$, $b$ and $n$ have the same meaning as in claim 1 and at least 0.3 mole of lithium sulfate per mole of the dye.

7. A process for manufacture of fiber-reactive dyes of the formula

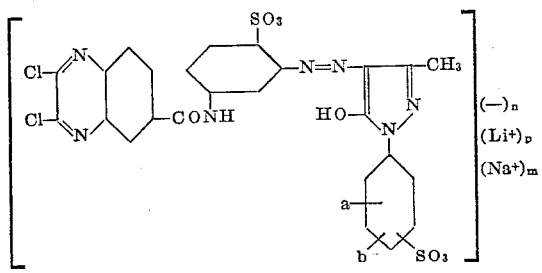

whereby an amino dye base of the formula

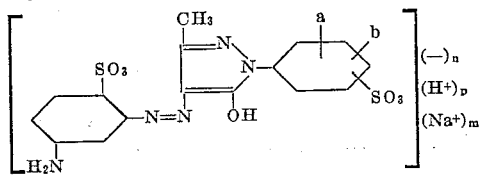

is condensed in aqueous medium with 1 molar equivalent of 2,3-dichloro-6-quinoxalinecarbonyl chloride while the pH is maintained at about 7.5 to 8 by addition of a lithium base selected from the group consisting of lithium hydroxide and lithium carbonate, where $a$, $b$, $n$, $p$ and $m$ are defined as in claim 1.

8. A process for the manufacture of fiber-reactive dyes comprising treating an aqueous solution of a fiber-reactive dye of the formula

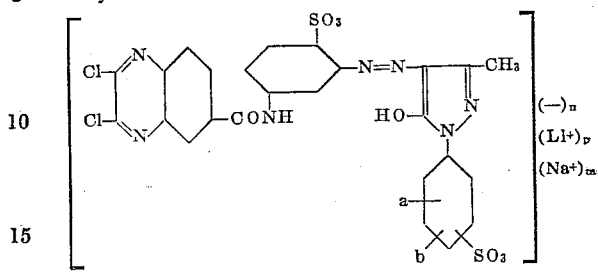

wherein $p$ is zero (0) and $a$, $b$, $n$ and $m$ are defined as in claim 1; with at least one chemical equivalent of a water soluble lithium salt.

No references cited.

CHARLES B. PARKER, *Primary Examiner.*

DONALD M. PAPUGA, *Assistant Examiner.*